(12) United States Patent
Chen et al.

(10) Patent No.: US 11,922,558 B2
(45) Date of Patent: Mar. 5, 2024

(54) HYBRID DIFFERENTIABLE RENDERING FOR LIGHT TRANSPORT SIMULATION SYSTEMS AND APPLICATIONS

(71) Applicant: NVIDIA Corporation, Santa Clara, CA (US)

(72) Inventors: Wenzheng Chen, Toronto (CA); Joey Litalien, Montreal (CA); Jun Gao, North York (CA); Zian Wang, Toronto (CA); Clement Tse Tsian Christophe Louis Fuji Tsang, Toronto (CA); Sameh Khamis, Oakland, CA (US); Or Litany, Sunnyvale, CA (US); Sanja Fidler, Toronto (CA)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/826,611

(22) Filed: May 27, 2022

(65) Prior Publication Data

US 2022/0383582 A1 Dec. 1, 2022

Related U.S. Application Data

(60) Provisional application No. 63/194,729, filed on May 28, 2021.

(51) Int. Cl.
*G06T 15/06* (2011.01)
*G06T 15/50* (2011.01)
*G06T 19/20* (2011.01)

(52) U.S. Cl.
CPC ............ *G06T 15/06* (2013.01); *G06T 15/506* (2013.01); *G06T 19/20* (2013.01); *G06T 2219/2012* (2013.01)

(58) Field of Classification Search
None
See application file for complete search history.

(56) References Cited

U.S. PATENT DOCUMENTS

2010/0328677 A1* 12/2010 Debevec ................ G01N 21/55
356/600
2018/0047208 A1* 2/2018 Marin .................. H04N 13/133

FOREIGN PATENT DOCUMENTS

WO 2022251619 A1 12/2022

OTHER PUBLICATIONS

Barrow, et al., "Recovering Intrinsic Scene Characteristics from Images", 1978, 25 pgs.
(Continued)

*Primary Examiner* — Frank S Chen
(74) *Attorney, Agent, or Firm* — Taylor English Duma L.L.P.

(57) ABSTRACT

In various examples, information may be received for a 3D model, such as 3D geometry information, lighting information, and material information. A machine learning model may be trained to disentangle the 3D geometry information, the lighting information, and/or material information from input data to provide the information, which may be used to project geometry of the 3D model onto an image plane to generate a mapping between pixels and portions of the 3D model. Rasterization may then use the mapping to determine which pixels are covered and in what manner, by the geometry. The mapping may also be used to compute radiance for points corresponding to the one or more 3D models using light transport simulation. Disclosed approaches may be used in various applications, such as image editing, 3D model editing, synthetic data generation, and/or data set augmentation.

20 Claims, 9 Drawing Sheets

(56) References Cited

OTHER PUBLICATIONS

Li, et al., "Differentiable Monte Carlo Ray Tracing through Edge Sampling", ACM Trans. Graph., vol. 37, No. 6, Article 222; Nov. 2018, 11 pgs.

Merlin, et al., "Mitsuba 2: A Retargetable Forward and Inverse Renderer", ACM Trans. Graph., vol. 38, No. 6, Article 203; Nov. 2019, 17 pgs.

Bangaru, et al., "Unbiased Warped-Area Sampling for Differentiable Rendering", ACM Trans. Graph., vol. 39, No. 6, Article 245; Dec. 2020, 18 pgs.

Nimier-David, et al., "Radiative Backpropagation: An Adjoint Method for Lightning-Fast Differentiable Rendering", ACM Trans. Graph., vol. 39, No. 4, Article 146; Jul. 2020, 15 pgs.

Zhang, et al., "Path-Space Differentiable Rendering", ACM Trans. Graph., vol. 39, No. 4, Article 143; Jul. 2020, 19 pgs.

Chen, et al., "Learning to Predict 3D Objects with an Interpolation-Based Differentiable Renderer", https://arxiv.org/abs/1908.01210, Nov. 21, 2019, 11 pgs.

Laine, et al., "Modular Primitives for High-Performance Differentiable Rendering", ACM Trans. Graph., vol. 39, No. 6, Article 194; Dec. 2020, 14 pgs.

Liu, et al., "Soft Rasterizer: A Differentiable Renderer for Image-Based 3D Reasoning" The IEEE International Conference on Computer Vision (ICCV), Oct. 2019.

Kato, et al., "Neural 3D Mesh Renderer", https://arxiv.org/abs/1711.07566, Nov. 20, 2017, 17 pgs.

Zhang, et al., "Image GANs Meet Differentiable Rendering for Inverse Graphics and Interpretable 3D Neural Rendering", https://arxiv.org/abs/2010.09125, Apr. 20, 2021, 25 pgs.

Narihira, et al., "Direct Intrinsics: Learning Albedo-Shading Decomposition by Convolutional Regression", https://arxiv.org/abs/1512.02311, Dec. 8, 2015, 9 pgs.

Shi, et al., "Learning Non-Lambertian Object Intrinsics Across ShapeNet Categories", https://arxiv.org/abs/1612.08510, Dec. 27, 2016, 19 pgs.

Li, et al., "Learning to Reconstruct Shape and Spatially-Varying Reflectance from a Single Image", ACM Trans. Graph., vol. 37, No. 6, Article 269, Nov. 2018, 11 pgs.

Boss, et al., "Two-Shot Spatially-Varying BRDF and Shape Estimation", https://arxiv.org/abs/2004.00403, Apr. 1, 2020, 10 pgs.

Bi, et al., "Deep Hybrid Real and Synthetic Training for Intrinsic Decomposition", https://arxiv.org/abs/1807.11226, Jul. 30, 2018, 11 pgs.

Alhaija, et al., "Intrinsic Autoencoders for Joint Neural Rendering and Intrinsic Image Decomposition", International Conference on 3D Vision (3DV), 2020, 12 pgs.

Liu, et al., "Unsupervised Learning for Intrinsic Image Decomposition from a Single Image", https://arxiv.org/abs/1911.09930, May 26, 2020, 10 pgs.

Wu, et al., "Unsupervised Learning of Probably Symmetric Deformable 3D Objects from Images in the Wild", https://arxiv.org/abs/1911.11130, Mar. 31, 2020, 18 pgs.

Wu, et al., "De-Rendering the World's Revolutionary Artefacts", arXiv preprint arXiv:2104.03954, 2021, 10 pgs.

Lettry, et al., "Unsupervised Deep Single-Image Intrinsic Decomposition Using Illumination-Varying Image Sequences", https://arxiv.org/abs/1803.00805, Sep. 3, 2018, 13 pgs.

Li, et al., "Learning Intrinsic Image Decomposition from Watching the World", https://arxiv.org/abs/1804.00582, Apr. 2, 2018, 10 pgs.

Ma, et al., "Single Image Intrinsic Decomposition without a Single Intrinsic Image", In Proc. of the European Conference on Computer Vision (ECCV), 2018, 17 pgs.

Yu, et al., "InverseRenderNet: Learning Single Image Inverse Rendering", https://arxiv.org/abs/1811.12328, Nov. 29, 2018, 10 pgs.

Karras, et al., "A Style-Based Generator Architecture for Generative Adversarial Networks", https://arxiv.org/abs/1812.04948, Mar. 29, 2019, 12 pgs.

Lensch, et al., "Image-Based Reconstruction of Spatially Varying Materials", In Proc. of the 12th Eurographics Conference on Rendering, 2001, 13 pgs.

Lensch, et al., "Planned Sampling of Spatially Varying BRDFs", Computer Graphics Forum, 2003, .

Dong, et al., "Appearance-from-Motion: Recovering Spatially Varying Surface Reflectance Under Unknown Lighting", ACM Trans. Graph. (Proc. SIGGRAPH Asia), vol. 33, Nov. 2014, 12 pgs.

Xia, et al., "Recovering Shape and Spatially-Varying Surface Reflectance under Unknown Illumination", ACM Trans Graph. (Proc. SIGGRAPH Asia), vol. 35, 12 pgs.

Nam, et al., "Practical SVBRDF Acquisition of 3D Objects with Unstructured Flash Photography", ACM Trans. Graph. (Proc. SIGGRAPH Asia), vol. 37, 12 pgs.

Bi, et al., "Neural Reflectance Fields for Appearance Acquisition", https://arxiv.org/abs/2008.03824, Aug. 16, 2020, 11 pgs.

Bi, et al., "Deep Reflectance Volumes: Relightable Reconstructions from Multi-View Photometric Images", https://arxiv.org/abs/2007.09892, Jul. 20, 2020, 21 pgs.

Boss, et al., "NeRD: Neural Reflectance Decomposition from Image Collections", https://arxiv.org/abs/2012.03918, 2020, 15 pgs.

Zhang, et al., "PhySG: Inverse Rendering with Spherical Gaussians for Physics-based Material Editing and Relighting", https://arxiv.org/abs/2104.00674, Apr. 1, 2021, 10 pgs.

Wang, et al., "All-frequency Rendering of Dynamic, Spatially-Varying Reflectance", ACM Trans. Graph. (Proc. SIGGRAPH), vol. 28, Dec. 2009, 10 pgs.

Deering, et al., "The Triangle Processor and Normal Vector Shader: A VLSI System for High Performance Graphics", Computer Graphics, vol. 22, No. 4, Aug. 1988, 10 pgs.

Kajiya, "The Rendering Equation", SIGGRAPH 1986, p. 143-150, 8 pgs.

Burley, "Physically-based Shading at Disney", In Practical Physically-Based Shading in Film and Game Production (SIGGRAPH Course), 2012, 42 pgs.

Karis (Epic Games), "Real Shading in Unreal Engine 4", in ACM SIGGRAPH 2013 Courses, 2013, 59 pgs.

Cook, et al., "A Reflectance Model for Computer Graphics", ACM Trans. Graph. vol. 1, Jan. 1982, 18 pgs.

Meder, et al., "Hemispherical Gaussians for Accurate Light Integration", Computer Vision and Graphics, 2018, __ pgs.

Ronnenberger, et al., "U-Net: Convolutional Networks for Biomedical Image Segmentation", https://arxiv.org/abs/1505.04597, May 18, 2015, 8 pgs.

Isola, et al., "Image-to-Image Translation with Conditional Adversarial Networks", https://arxiv.org/abs/1611.07004, Nov. 26, 2018, 17 pgs.

Zhang, et al., "The Unreasonable Effectiveness of Deep Features as a Perceptual Metric", https://arxiv.org/abs/1801.03924, Apr. 10, 2018, 14 pgs.

Krizhevsky, et al., "Imagenet Classification with Deep Convolutional Neural Networks", Advances in Neural Information Processing Systems, vol. 25, Curran Associates, Inc., 2012, 9 pgs.

Xu, et al., "Anisotropic Spherical Gaussians", ACM Trans. Graph. (Proc. SIGGRAPH), vol. 32, Nov. 2013, 11 pgs.

Zhang, et al., "DatasetGAN: Efficient Labeled Data Factory with Minimal Human Effort", https://arxiv.org/abs/2104.06490, Apr. 20, 2021, 11 pgs.

Chen, Wenzheng, International Search Report and Written Opinion for PCT Application No. PCT/US2022/031324, filed May 27, 2022, dated Sep. 21, 2022, 12 pgs.

Hiroharu Kato et al: "Differentiable Rendering: A Survey", ARXIV.org, Cornell University, Jul. 31, 2020, pp. 1-20.

Zhengqin Li et al: "Inverse Rendering for Complex Indoor Scenes: Shape, Spatially-Varying Lighting and SVBRDF from a Single Image", ARXIV.org, Cornell University Library, May 7, 2019, pp. 1-18.

Kai Zhang et al: "PhySG: Inverse Rendering with Spherical Gaussians for Physics-based Material Editing and Relighting", ARXIV.org, Cornell University, Apr. 1, 2021; pp. 1-10.

Wenzheng Chen et al: "Learning to Predict 3D objects with an Interpolation-based Differentiable Renderer", ARXIV.org; Cornell University Library, Aug. 3, 2019, pp. 1-11.

(56) References Cited

OTHER PUBLICATIONS

Chen, Wenzheng; International Preliminary Report on Patentability for PCT Application No. PCT/US2022/031324, filed May 27, 2022, dated Dec. 7, 2023, 10 pgs.

* cited by examiner

HYBRID DIFFERENTIABLE RENDERING FOR LIGHT TRANSPORT SIMULATION SYSTEMS AND APPLICATIONS

CROSS-REFERENCE TO RELATED APPLICATIONS

This application claims the benefit of U.S. Provisional Application No. 63/194,729, filed on May 28, 2021, which is hereby incorporated by reference in its entirety.

BACKGROUND

Ray-tracing-based rendering is typically divided into physics-based methods, which focus on creating photorealistic images, and approximation methods—such as rasterization-based methods—which aim to achieve higher performance while often sacrificing photorealism. Physics-based methods may differentiate forward light transport simulation with careful handling of geometric discontinuities. While capable of supporting advanced lighting effects, such as global illumination, these approaches tend to be slow to optimize and require a detailed initial description of inputs in terms of geometry, materials, lighting, and camera, which hinders use of these types of renders in real-world applications. Rasterization-based methods may approximate gradients by generating derivatives from projected pixels to three-dimensional (3D) parameters. However, these methods are restricted to primary visibility and ignore indirect lighting effects by design. Still, these methods are often used for real-world applications, such as 3D reconstruction, due to their simplicity and efficiency relative to physics-based methods.

Inverse rendering aims to estimate physical attributes of a scene—such as reflectance, geometry, and lighting—from one or more images. Learning-based inverse graphics may train a neural network to estimate geometry, reflectance, and illumination from image observations. A conventional method for inverse graphics may train neural networks to learn data-driven features using synthetic data for supervision. However, these methods may not generalize to complex real-world images. For example, while self-supervised learning (e.g., domain adaptation) may be used to recover scene intrinsics, these methods either rely on specific priors or require data that is difficult to capture in practice. Other conventional methods for inverse graphics attempt to handle photorealistic effects, but require complex capture settings, such as controllable lighting, a co-located camera-flashlight setup, and densely captured multi-view images with known lighting or hand-crafted inductive labels.

SUMMARY

Embodiments of the present disclosure relate to hybrid differentiable rendering for disentangling material from lighting. More specifically, the disclosure relates to rendering approaches which may combine aspects of rasterization and ray-tracing to efficiently render 3D models while supporting advanced lighting effects. In further respects, the rendering may be differentiable, such that it may be effectively implemented in a processing pipeline to train a machine learning model to perform a task—such as disentangling material from lighting in input data.

In contrast to conventional approaches, such as those described above, disclosed approaches combine aspects of rasterization and ray-tracing to efficiently render 3D models while supporting advanced lighting effects. In at least one embodiment, various information may be received for one or more 3D models, such as 3D geometry information, lighting information, and material information. In at least one embodiment, one or more machine learning models (MLMs) may be trained to disentangle the 3D geometry information, the lighting information, and/or the material information from input data so as to provide the information for rendering. The received information may be used to project geometry of the one or more 3D models onto an image plane to generate a mapping between one or more pixels and one or more portions of the one or more 3D models. Rasterization may then use the mapping to determine which pixels are covered and in what manner, by the geometry. The mapping may also be used to compute radiance for one or more points corresponding to the one or more portions of the one or more 3D models using light transport simulation. Disclosed approaches may be used in various applications, such as, without limitation, image editing, 3D model editing, synthetic data generation, and/or data set augmentation.

BRIEF DESCRIPTION OF THE DRAWINGS

The present systems and methods for hybrid differentiable rendering for disentangling material from lighting are described in detail below with reference to the attached drawing figures, wherein.

DETAILED DESCRIPTION

Figure 1:
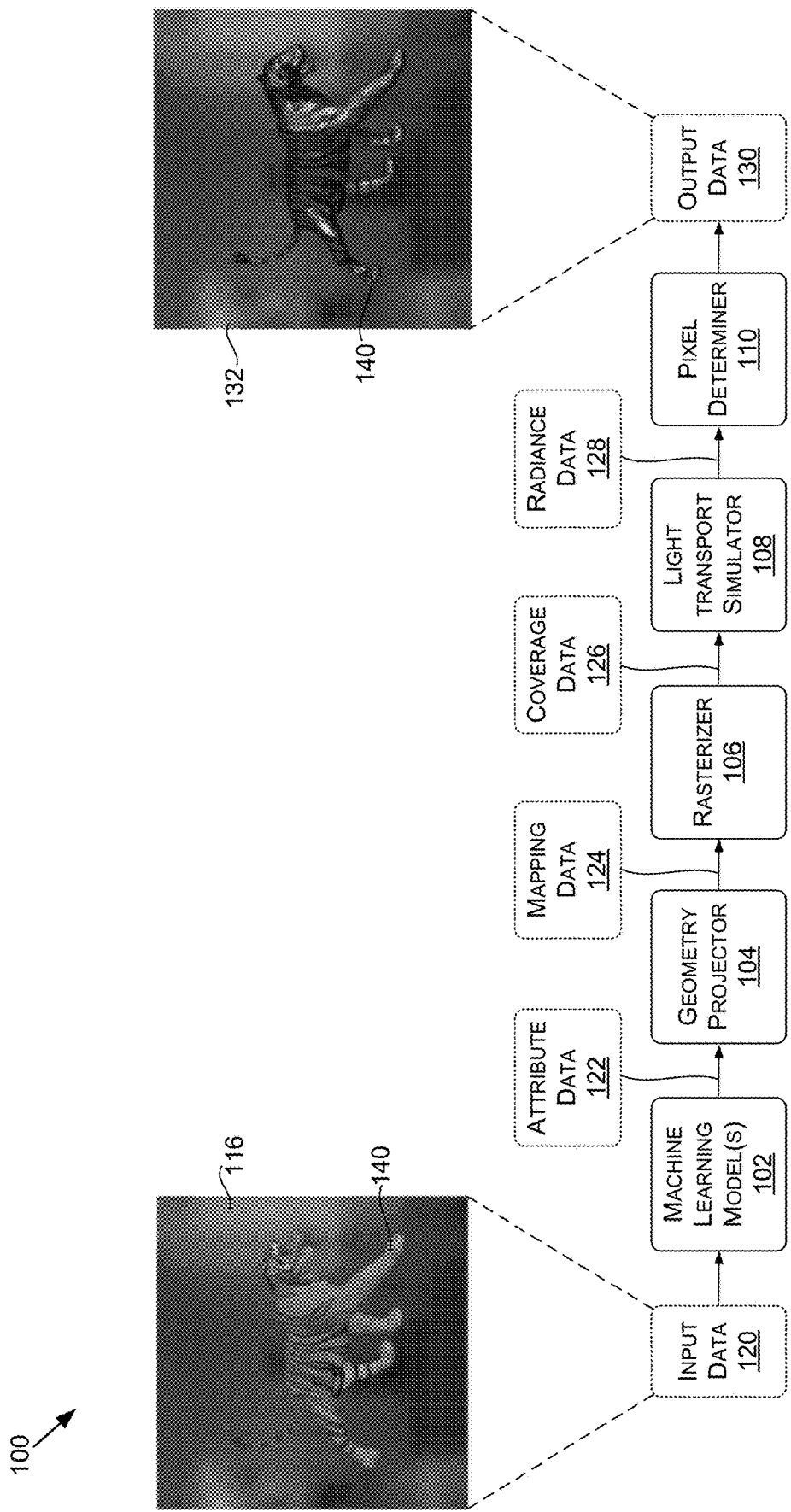
FIG. 1 is an illustration of an example process that may be used to determine one or more pixel values using hybrid differentiable rendering, in accordance with some embodiments of the present disclosure.

The present disclosure relates to hybrid differentiable rendering for disentangling material from lighting. More specifically, the disclosure relates to rendering approaches which may combine aspects of rasterization and ray-tracing to efficiently render 3D models while supporting advanced lighting effects. In further aspects, the rendering may be differentiable, such that it may be effectively implemented in a processing pipeline to train a machine learning model to perform a task, such as disentangling material from lighting in input data.

Disclosed approaches provide for hybrid differentiable rendering by combining aspects of rasterization and ray-tracing to efficiently render 3D models while supporting advanced lighting effects. In at least one embodiment, various information may be received for one or more 3D models (e.g., a 3D mesh), such as 3D geometry information (e.g., vertex positions, surfaces, curves, points, voxels, etc.), lighting information (e.g., environmental lighting), and/or material information (e.g., surface normals, color information, such as diffuse albedo, surface roughness, a model mask, transparency information, etc.). The received information may be used to project geometry of the one or more 3D models onto an image plane (e.g., using a vertex shader) to generate a mapping between one or more pixels and one or more portions of the one or more 3D models. Rasterization may then use the mapping to determine which pixels are covered and in what manner by the geometry. The mapping may also be used to compute radiance for one or more points corresponding to the one or more portions of the one or more 3D models using light transport simulation. For example, the system may evaluate a specular bidirectional reflectance distribution function (BRDF) for the one or more points, allowing for simulation of glossy and mirror surfaces. One or more one or more pixel values for the one or more pixels (e.g., for a rendered image) may be determined using the radiance.

In at least one embodiment, the mapping may be generated based at least on projecting, in a scene, at least a portion of the one or more 3D models onto the image plane using one or more rays cast from one or more cameras in the scene. The one or more points may correspond to intersections of the one or more rays with the geometry of the one or more 3D models. In at least one embodiment, the mapping may be a differentiable mapping and the one or more pixel values may be determined using a differentiable parameterization of shading for the one or more pixels. Using a differentiable mapping and a differentiable parameterization may provide output data suitable for training one or more machine learning models. For example, the one or more machine learning models may be trained to learn one or more portions of the 3D geometry information, lighting information, and/or material information using the output data.

In at least one embodiment, the one or more machine learning models may be trained to disentangle the 3D geometry information, the lighting information, and/or the material information from input data. For example, the input data may represent one or more images, such as a single image depicting an object(s) corresponding to the 3D model(s). The one or more pixel values for the one or more pixels may correspond to a rendered image(s) of at least a portion of the 3D model(s). One or more portions of the rendered image may be compared to one or more portions of the image(s) represented by the input data to evaluate a loss function used to train, validate, and/or verify the machine learning model(s). Thus, the machine learning model(s) may be trained in an unsupervised manner. In one or more embodiments, the loss function(s) may be based at least on the image foreground (e.g., the portion of the image depicting the rendered one or more 3D models), as opposed to the image background (e.g., the portion of the image not depicting the rendered one or more 3D models).

Disclosed approaches may be used for various applications. For example, disentangled attribute data (e.g., materials, environmental or model lighting, geometry) may be determined from input data using the machine learning model(s). One or more portions of the attribute data may be modified, replaced, removed, or otherwise used to re-render the input data so as to reflect those changes (e.g., as part of image editing software). Similarly, one or more portions of the attribute data may be used or modified and applied to one or more models (e.g., the same or a different model than the model(s) corresponding to the input data) or other objects in a virtual scene, which may be rendered to generate one or more images (e.g., as part of 3D modeling software). As an example, a 3D model of a vehicle may be rendered using the corresponding radiance, but with different color information to change the color of the vehicle depicted in an input image. As a further example, one or more portions may be applied to one or more models used to render a video game and/or video.

The systems and methods described herein (e.g., using the MLMs) may be used for a variety of purposes, by way of example and without limitation, these purposes may include systems or applications for machine control, machine locomotion, machine driving, synthetic data generation, model training, perception, augmented reality, virtual reality, mixed reality, robotics, security and surveillance, autonomous or semi-autonomous machine applications, deep learning, environment simulation, data center processing, conversational AI, light transport simulation (e.g., ray-tracing, path tracing, etc.), collaborative content creation for 3D assets, digital twin systems, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems for generating or maintaining digital twin representations of physical objects, systems implemented at least partially using cloud computing resources, and/or other types of systems.

FIG. 1 is an illustration of an example process 100 that may be used to determine one or more pixel values using hybrid differentiable rendering, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The process 100 may be implemented using, among other components, one or more machine learning models (MLMs) 102, a geometry projector 104, a rasterizer 106, a light transport simulator 108, and/or a pixel determiner 110. The process 100 (and the components and/or features thereof) may be implemented using one or more computing devices, such as the computing device 600 of FIG. 6 and/or one or more data centers, such as the data center 700 of FIG. 7, described in more detail below.

At a high level, the process 100 may include the MLM(s) 102 receiving one or more inputs, such as one or more samples represented by input data 120 (e.g., a single image, multiple images, etc.), and generating one or more outputs, such as attribute data 122 (e.g., environmental lighting, surface normals, 3D geometry, color information, etc. for one or more 3D models) from the one or more inputs. The process 100 may also include the geometry projector 104 receiving one or more inputs, such as one or more portions of the attribute data 122, and generating one or more outputs, such as mapping data 124 (e.g., representing one or more mappings between one or more pixels and one or more portions of the one or more 3D models) from the one or more inputs. The rasterizer 106 may receive one or more inputs, such as one or more portions of the mapping data 124, and generate one or more outputs, such as coverage data 126 (e.g., indicating coverage of the one or more pixels by geometry of the one or more 3D models) from the one or more inputs. The light transport simulator 108 may receive one or more inputs, such as one or more portions of the coverage data 126, and generate one or more outputs, such as radiance data 128 (e.g., representing radiance for the one or more pixels) from the one or more inputs. Pixel determiner 110 may receive one or more inputs, such as one or more portions of the radiance data 128, and generate one or more outputs, such as output data 130 (e.g., representing pixels values for the one or more pixels) from the one or more inputs.

The MLM(s) 102 and other MLMs described herein may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, one or more neural networks (e.g., auto-encoders, convolutional, recurrent, perceptrons, Long/Short Term Memory (LSTM), Hopfield, Boltzmann, deep belief, deconvolutional, generative adversarial, and/or liquid state machine, etc.), and/or other types of machine learning models.

As examples, such as where the machine learning model(s) 102 include at least one convolutional neural network (CNN), the machine learning model(s) 102 may include any number of layers. One or more of the layers may include an input layer. The input layer may hold values associated with the input data 120 (e.g., before or after pre-processing). For example, when a sample in the input data 120 represents an image, the input layer may hold values representative of the raw pixel values of the image(s) as a volume (e.g., a width, a height, and color channels (e.g., RGB), such as 32×32×3).

One or more layers may include convolutional layers. The convolutional layers may compute the output of neurons that are connected to local regions in an input layer, each neuron computing a dot product between their weights and a small region they are connected to in the input volume. A result of the convolutional layers may be another volume, with one of the dimensions based on the number of filters applied (e.g., the width, the height, and the number of filters, such as 32×32×12, if 12 were the number of filters).

One or more of the layers may include a rectified linear unit (ReLU) layer. The ReLU layer(s) may apply an elementwise activation function, such as the max (0, x), thresholding at zero, for example. The resulting volume of a ReLU layer may be the same as the volume of the input of the ReLU layer.

One or more of the layers may include a pooling layer. The pooling layer may perform a down sampling operation along the spatial dimensions (e.g., the height and the width), which may result in a smaller volume than the input of the pooling layer (e.g., 16×16×12 from the 32×32×12 input volume).

One or more of the layers may include one or more fully connected layer(s). Each neuron in the fully connected layer(s) may be connected to each of the neurons in the previous volume. The fully connected layer may compute class scores, and the resulting volume may be 1×1×number of classes. In some examples, the CNN may include a fully connected layer(s) such that the output of one or more of the layers of the CNN may be provided as input to a fully connected layer(s) of the CNN. In some examples, one or more convolutional streams may be implemented by the machine learning model(s) 102, and some or all of the convolutional streams may include a respective fully connected layer(s).

In some non-limiting embodiments, the machine learning model(s) 102 may include a series of convolutional and max pooling layers to facilitate image feature extraction, followed by multi-scale dilated convolutional and up-sampling layers to facilitate global context feature extraction.

Although input layers, convolutional layers, pooling layers, ReLU layers, and fully connected layers are discussed herein with respect to the machine learning model(s) 102, this is not intended to be limiting. For example, additional or alternative layers may be used in the machine learning model(s) 102, such as normalization layers, SoftMax layers, gradient reversal layers, and/or other layer types.

In embodiments where the machine learning model(s) 102 includes a neural network, different orders and/or numbers of the layers of the neural network may be used depending on the embodiment. In other words, the order and number of layers of the machine learning model(s) 102 is not limited to any one architecture.

In addition, some of the layers may include parameters (e.g., weights and/or biases), such as the convolutional layers and the fully connected layers, while others may not, such as the ReLU layers and pooling layers. In some examples, the parameters may be learned by the machine learning model(s) 102 during training, for example, described with respect to FIG. 3. Further, some of the layers may include additional hyper-parameters (e.g., learning rate, stride, epochs, etc.), such as the convolutional layers, the fully connected layers, and the pooling layers, while other layers may not, such as the ReLU layers. The parameters and hyper-parameters are not to be limited and may differ depending on the embodiment.

In at least one embodiment, the MLM(s) 102 may be trained to predict the attribute data 112 from the input data 120 (e.g., an image 116). For example, the attribute data 122 may include the image 116 depicting one or more objects, such as an object 140. The MLM 102 may be trained to infer one or more attributes of or in association with the object 140, which may be captured by the attribute data 122.

Non-limiting examples of the attributes include values representing and/or indicating one or more of environmental lighting, spatially-varying material parameters, material maps and/or properties, one or more textures, surface normals, 3D geometry, or color information for one or more 3D models. In at least one embodiment, the attribute data 122 may represent one or more attributes of a 3D mesh.

Figure 2A:
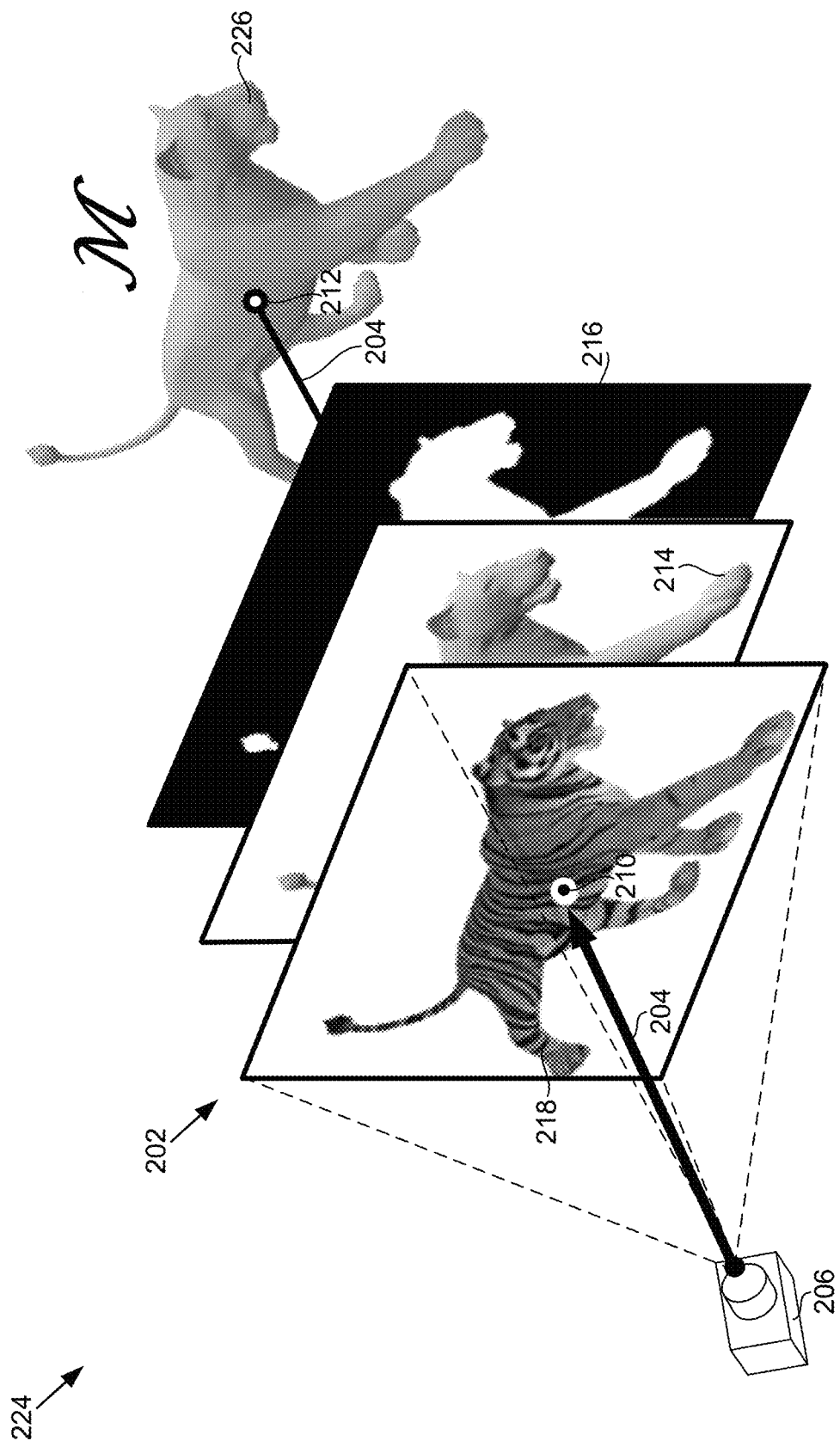
FIG. 2A illustrates an example of geometry projection and rasterization which may be used in hybrid differentiable rendering, in accordance with some embodiments of the present disclosure.
Figure 2B:
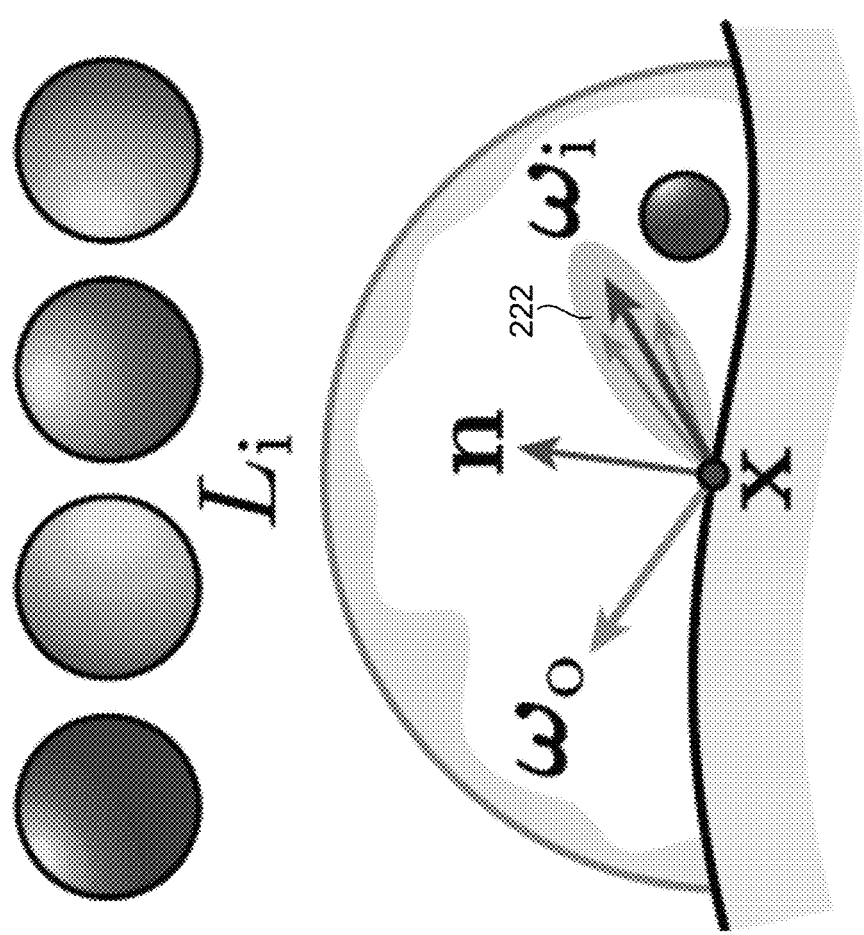
FIG. 2B illustrates an example of aspects of light transport simulation which may be used in hybrid differentiable rendering, in accordance with some embodiments of the present disclosure.
Figure 2D:
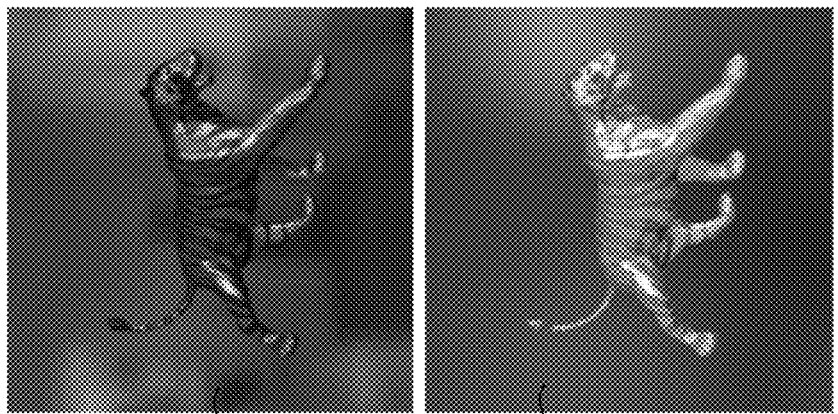
FIG. 2D illustrates examples of environmental lighting which may be used in hybrid differentiable rendering, in accordance with some embodiments of the present disclosure.
Figure 2C:
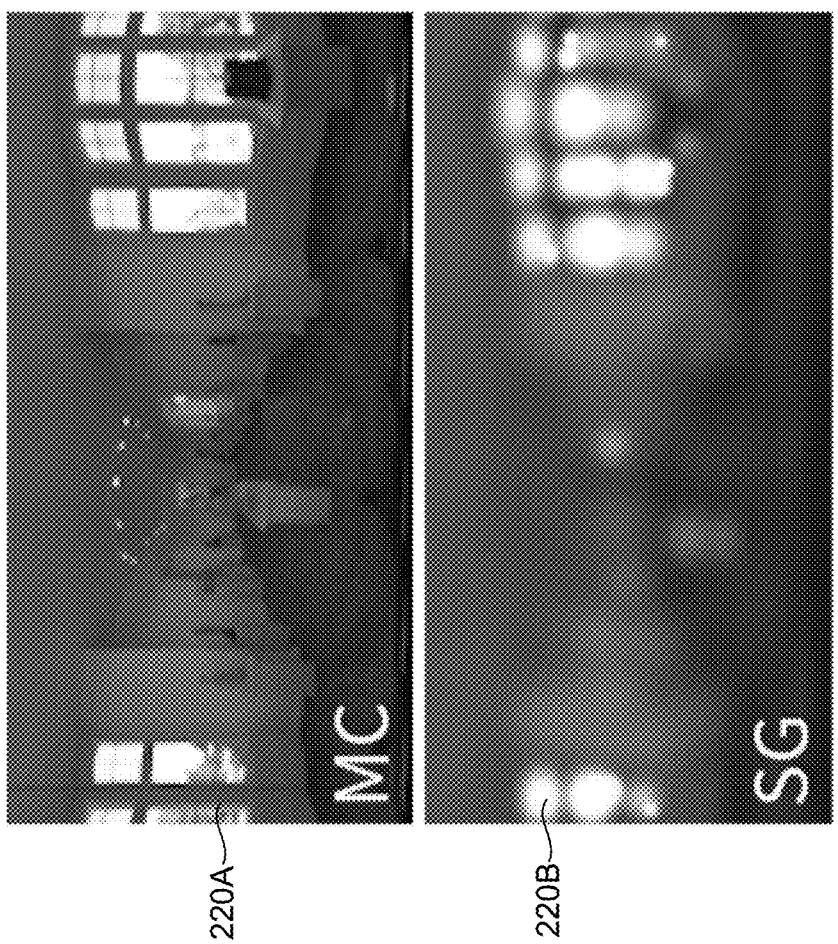
FIG. 2C illustrates examples of environmental lighting which may be used in hybrid differentiable rendering, in accordance with some embodiments of the present disclosure.

FIGS. 2A and 2C include examples of attributes, which may be generated using the MLM 102. For example, FIG. 2A shows a representation of 3D geometry 226 for a 3D model(s) corresponding to the object(s) 140. The 3D geometry 226 may be represented using various formats. Non-Limiting examples include vertex positions, surfaces, curves, points, splines, and/or voxels. FIG. 2A also shows a representation of color information 218 for the 3D model(s) 140 corresponding to the object(s) 140. In at least one embodiment, the color information 218 may represent at least a diffuse albedo (a spatially-varying material parameter) for the object 140. However, in other examples, the color information 218 may represent spatially-varying color information. FIG. 2A also shows a representation of surface normals 214 for the 3D model(s) 140 corresponding to the object(s) 140. FIG. 2A further shows a representation of a model mask 216 for the 3D model(s) 140 corresponding to the object(s) 140. In at least one embodiment, the model mask 216 may represent a silhouette mask of the 3D model(s). Referring to FIG. 2C, FIG. 2C shows a representation of environmental lighting 220A for the 3D model(s) 140 corresponding to the object(s) 140 and a representation of environmental lighting 220B for the 3D model(s) 140 corresponding to the object(s) 140. The environmental lighting 220A and the environmental lighting 220B may correspond to different lighting models. For example, the environmental lighting 220A is shown as corresponding to a Monte Carlo (MC)-based lighting model and the environmental lighting 220B is shown as corresponding to a spherical Gaussian (SG)-based lighting model.

While shown as being generated using the MLM(s) 102, in at least one embodiment, one or more of the attributes—or portions thereof—represented by the attribute data 122 may not be generated using the MLM(s) 102 and/or may be modified prior to being applied to corresponding components in the process 100. For example, in at least one embodiment, the attribute data 122 may be determined and/or generated using any suitable approach, which may vary depending on the application for which the process 100 is being employed. As an example, one or more portions of the attribute data 122 may be generated using 3D modeling software and/or non-machine learning-based techniques. In these and other examples, the input data 120 may additionally or alternatively represent user input and/or other suitable data used to define the attributes.

Returning to FIG. 1, the geometry projector 104 may be configured to generate the mapping data 124 using one or more portions of the attribute data 122. The mapping data may represent one or more mappings between one or more pixels and one or more portions of the 3D model(s). Referring now to FIG. 2A, FIG. 2A illustrates an example of geometry projection and rasterization which may be used in hybrid differentiable rendering, in accordance with some embodiments of the present disclosure. The mappings may be generated based at least on the geometry projector 104 projecting, in a scene, at least a portion of the one or more 3D models onto an image plane using one or more rays cast from one or more cameras in the scene. For example, the geometry projector 104 may project, in a scene 224, at least a portion of a 3D model(s) onto an image plane 202 using a ray 204 cast from a camera 206 in the scene 224. Based at least on intersections between the ray 204, the image plane 202, and the 3D geometry 226, the geometry projector 104 may generate a mapping between a pixel(s) corresponding to a point 210 of intersection on the image plane 202 and one or more portions (e.g., a surface point) of the 3D model(s) $\mathcal{M}$ corresponding to a point 212 (e.g., the surface point) of intersection with the 3D geometry 226. In at least one embodiment, the mapping may be a differentiable mapping.

The rasterizer 106 may be configured to generate the coverage data 126 using one or more portions of the mapping data 124. For example, the rasterizer 106 may use the mapping(s) determined using the geometry projector 104 to determine which pixels are covered and in what manner, by the 3D geometry 226 (e.g., with respect to faces of the 3D geometry 226). This may involve the rasterizer 106 performing a coverage test where the rasterizer 106 determines which if any of the pixels overlap the projected image of the triangle or other geometry portion.

The light transport simulator 108 may be configured to generate the radiance data 128 using one or more portions of the coverage data 126. The radiance data may represent radiance for the one or more pixels. In at least one embodiment, the light transport simulator may compute radiance for the pixel(s) corresponding to the point 210 using light transport simulation. For example, the system may evaluate a specular BRDF for the point(s) 212 corresponding to the 3D geometry 226 to compute the radiance, and apply or otherwise associate the radiance with the pixel(s).

Referring now to FIG. 2B, FIG. 2B illustrates an example of aspects of light transport simulation which may be used in hybrid differentiable rendering, in accordance with some embodiments of the present disclosure. As indicated in FIG. 2B, the light transport simulator 108 may compute the incident radiance $L_i$ based at least on evaluating a BRDF 222 (a specular BRDF). In FIG. 2B, x may refer to the point for which radiance is being evaluated, such as the point 212 in FIG. 2A, n may refer to the surface normal for x, $\omega_o$ may refer to the outgoing light direction, and $\omega_i$ may refer to the incoming light direction. In at least one embodiment, the surface normal(s) n for the point x used in computing the radiance may be retrieved from the surface normals 214 (e.g., a surface normal map).

Various ray-tracing techniques may be used to evaluate the radiance for the point x. In at least one embodiment, $\pi \in \mathbb{R}^{d_\pi}$ may encode the 3D geometry 226 (e.g., vertex positions), $\theta \in \mathbb{R}^{d_\theta}$ may describe material properties, and $\gamma \in \mathbb{R}^{d_\gamma}$ may describe the illumination in the scene 224. Herein, rendering for a single pixel indexed by p, within an RGB image, $I \in \mathbb{R}_+^{3 \times h \times w}$ is described for notational simplicity. As described herein, the rasterizer 106 may be a differentiable rasterizer R, used to generate primary rays $\omega_o \in \mathcal{S}^2$ (e.g., the ray 204) from the camera 206, and render the scene into geometry buffers (G-Buffers) containing the surface intersection point $x_p \in \mathbb{R}^3$, the surface normal $n_p \in \mathcal{S}^2$, and the spatially-varying material parameters $\theta_p$ (e.g., the diffuse albedo). This rendering pass may return a visibility mask $v_p \in \{0,1\}$ indicating whether pixel p is occupied by the rendered object, separating the foreground object $I_f$ from its background environment $I_b$ so that image $I = I_f + I_b$. Thus, a rendering model R may be formulated in accordance with Equation (1):

$$R(\mathcal{M}, p, \omega_o) = (x_p, n_p, \theta_p, v_p) \qquad (1)$$

Given surface properties and outgoing light direction $\omega_o$, the outgoing radiance $L_o(x_p, \omega_o)$ may be approximated. In at least one embodiment, several potential assumptions may be made to simplify the outgoing radiance approximation. For example, the light transport simulator 108 may limit light transport simulation to direct illumination (single-bound scattering). Further, in an least one embodiment, the light transport simulator 108 may assume the incoming radiance $L_i$ is given by an environment map (e.g., the environmental lighting 220A and/or the environmental lighting 220B) in accordance with $L_i: S^2 \rightarrow \mathbb{R}_+^2$. Therefore, in at least one embodiment, self-occlusion may not be modeled and $L_t(x_p, \omega_i) \equiv L_i(\omega_i;\gamma)$. Such a simplification may be used to reduce computation and memory consumption while being trivially differentiable.

Additionally or alternatively, it may be assumed that the material parameters θ can model both diffuse and specular view-dependent effects. In at least one embodiment, the pixel determiner 110 may use a shading model S formulated in accordance with Equation (2):

$$S(x_p, n_p, \omega_o; \theta_p, \gamma) \approx L_o(x_p, \omega_o) \quad (2)$$

The differentiable parameterization of S may enable the pixel determiner 110 to compute pixel gradients with respect to all scene parameters $\Theta=(\pi,\theta,\gamma)$ by differentiating $I_p(\Theta)=(S \circ R)(\mathcal{M}, p, \omega_o)$. In various embodiments, $\partial I/(\partial\{\theta,\gamma\})$ may be formulated so that all gradients can be computed using the chain rule, allowing for joint optimization of geometry, material, and/or lighting parameters.

Examples of shading models are provided, which may assume a fixed pixel p for conciseness, and remove the subscript. In particular, as described herein, non-limiting examples include an MC lighting model and an SG lighting model. The MC lighting model may target more mirror-like objects and may better approximate higher frequency in the integrand. The MC lighting model may use MC integration to compute radiance, which may involve tracing one or more rays from the camera 206 into the scene 224. The SG lighting model may be less computationally expensive to compute and be more robust to roughness variations, while being limited by the number of basis elements. To model reflectance, the BRDF 222 may be based at least on the diffuse albedo $\alpha \in [0,1]^3$, the specular albedo $\mathcal{S} \in [0,1]$, surface roughness $\beta \in [0,1]$, and metalness $m \in [0,1]$. The metalness may provide for modeling of both metals and plastics in a unified framework. The diffuse albedo may be allowed to vary spatially (a=a(x)) and (e.g., all) other attributes may be defined globally to restrict the number of learnable parameters.

Example of a MC Lighting Model

Given a surface point $x \in M$ to shade, the light transport simulator 108 may importance sample the BRDF 222 to obtain N light directions $\omega_i^k$ and to compute the BRDF value. The incident lighting $L_i^{MC}$ may be modeled as a high-dynamic range image $\gamma \in \mathbb{R}_+^{3 \times h_i \times w_i}$ using an equirectangular projection, which the light transport simulator 108 can query for any direction via interpolation between nearby pixels. The light transport simulator 108 may then compute a pixel color based at least on an average or other method of combining the samples, which may be divided by the probability of sampling $\omega_i^k$, resulting in a shading model $S^{MC}$ in accordance with Equation (3):

$$S^{MC}(x, n, \omega_o; \theta, \gamma) = \frac{1}{N} \sum_{k=1}^{N} \frac{f_x(x, \omega_i^k, \omega_o; \theta)L_i^{MC}(\omega_i^k;\gamma)|n \cdot \omega_i^k|}{p(\omega_i^k)} \quad (3)$$

Example of a SG Lighting Model

Projecting both the cosine-weighted BRDF and incident radiance into an SG basis may allow for fast, analytic integration within a differentiable shader, at the cost of some high frequency features in the integrand. In at least one embodiment, the light transport simulator 108 may use an SG kernel taking the form $(\omega; \xi, \gamma, \mu) = \mu e^{\gamma(\xi \cdot \omega - 1)}$, where $\omega \in S^2$ is the input spherical direction to evaluate, $\xi \in S^2$ is the axis, $\lambda \in \mathbb{R}_+$ is the sharpness, and $\mu \in \mathbb{R}_+^3$ is the amplitude of the lobe. In at least one embodiment, the environmental lighting 202A may be represented using a mixture of K lighting SGs $\mathcal{G}_l$, in accordance with Equation (4):

$$L_i^{SG}(\omega_i; \gamma) \approx \sum_{k=1}^{K} \mathcal{G}_l^k(\omega_i; \xi_l^k, \lambda_l^k, \mu_l^k) \quad (4)$$

where $\gamma:=\{\xi_l^k, \lambda_l^k, \mu_l^k\}_k$. For the BRDF 222, the light transport simulator 108 may fit a single, monochromatic SG to the specular lobe so that $f_r^{(SG)}$ is a sum of diffuse and specular lobes. Further, the light transport simulator 108 may approximate the cosine foreshortening term using a single $SG|n \cdot \omega_i| \approx \mathcal{G}_c$. Thus, the pixel determiner 110 may implement a shading model $S^{(SG)}$ in accordance with Equation (5):

$$S^{(SG)}(x,n,\omega_o;\theta,\gamma) = \int_{S^2} f_r^{(SG)}(x,\omega_i^k,\omega_o;\theta) L_i^{(SG)}(\omega_i;\gamma)$$
$$\mathcal{G}_c(\omega_i)d\omega_i \quad (5)$$

which has an analytic form that can be automatically differentiated. All parameters of the SGs, as well as the BRDF parameters may be learnable.

Referring now to FIG. 2D, FIG. 2D illustrates examples of images 132 and 232 which may be generated using hybrid differentiable rendering, in accordance with some embodiments of the present disclosure. For example, the output data 130 may represent one or more of the images 132 or 232. The image 132 may correspond to the MC lighting model and the image 232 may correspond to the SG lighting model. While the images 132 and 232 reflect radiance computed using the light transport simulator 108, as described herein, disentangled attribute data (e.g., materials, environmental or model lighting, geometry) may be determined from input data using the machine learning model(s). One or more portions of the attribute data may be modified, replaced, removed, or otherwise used to re-render the input data 120 so as to reflect those changes (e.g., as part of image editing software).

Similarly, one or more portions of the attribute data may be used or modified and applied to one or more models (e.g., the same or a different model than the model(s) corresponding to the input data 120) or other objects in a virtual scene, which may be rendered to generate one or more images (e.g., as part of 3D modeling software). As an example, a 3D model of the tiger may be rendered using the corresponding radiance to generate the image 116, but with different metalness or other attributes to change the material of the tiger depicted in the image 132. In one or more embodiments, these approaches may be used for synthetic data generation. The synthetic data may be used to train one or more machine learning models. By way of example, and not limitation, the process 100 may be used to augment a dataset used for training the one or more machine learning models.

Figure 3:
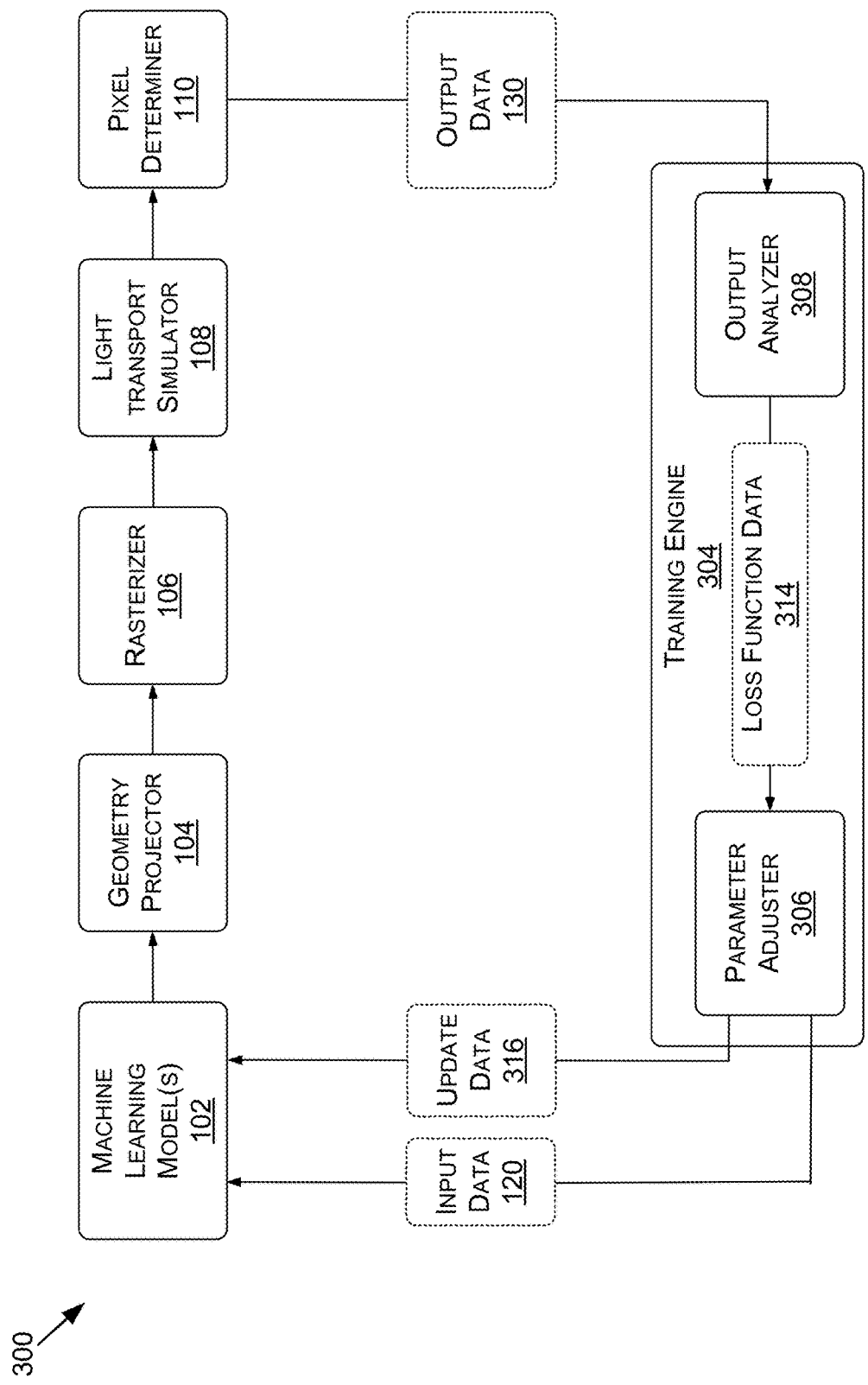
FIG. 3 is an illustration of an example process that may be used to train one or more machine learning models using hybrid differentiable rendering, in accordance with some embodiments of the present disclosure.

As described herein, hybrid differentiable rendering may be used as in a processing pipeline with a machine learning model for training to perform a task, such as disentangling material from lighting in input data. For example, hybrid differentiable rendering may be used in a learning-based formulation of single-image 3D reconstruction without supervision. Geometry, Reflectance, and lighting may be jointly inferred for a single image Ĩ containing strong specular transport. Referring now to FIG. 3, FIG. 3 is an illustration of an example process 300 that may be used to train one or more machine learning models using hybrid differentiable rendering, in accordance with some embodiments of the present disclosure. For example, the process 300 may be used to implement the learning-based formulation of single-image 3D reconstruction without supervision and/or for other suitable tasks.

At a high level, the process 300 may include the MLM(s) 102 receiving one or more inputs, such as one or more samples of a dataset(s) (e.g., the input data 120), and generating one or more outputs, such as the output data 130 (e.g., an output image) from the one or more inputs. As indicated in FIG. 3, the input data 120 may be applied to the MLM(s) 102 by a training engine 304. The process 300 may also include an output analyzer 308 of the training engine 304 receiving one or more inputs, such as the output data 130, and generating one or more outputs, such as loss function data 314 (e.g., representing one or more losses for the one or more MLMs 102 with respect to one or more cost functions) from the one or more inputs. The parameter adjuster 306 may receive one or more inputs, such as the loss function data 314, and generate one or more outputs, such as update data 316 (e.g., representing updates to one or more values of one or more parameters of one or more of the MLMs 102) from the one or more inputs. The parameter adjuster 306 may apply the update data 316 to the MLM(s) 102 to update one or more values of one or more parameters of one or more of the MLMs 102 according to the update data 316. The process 100 may repeat for any number of iterations, for example, until the MLM(s) 102 is fully trained. For example, the training engine 304 may determine to end training using any suitable approach, such as determining the MLM(s) 102 has converged (e.g., using the loss function data 314), determining a threshold number of training iterations have occurred, etc. The MLM(s) 102 may be deployed and/or subjected to additional verification, testing, and/or adaptation based at least on the determination.

The output analyzer 308 of the training engine 304 may be configured to generate the loss function data 314 from the output data 130. The output data 130 may represent one or more outputs generated using one or more of the MLM(s) 102. The output analyzer 308 may generate the loss function data 314 based at least on analyzing the output data 130. The analysis of the output data 130 may be performed using various approaches. In at least one embodiment, the output analyzer 308 may include one or more optimizers or solvers the training engine 304 may use to define how to change the parameters of one or more of the MLM(s) 102, such as weights, biases, and learning rate, in order to reduce losses according to a loss or cost function(s).

The parameter adjuster 306 may be configured to generate one or more outputs, such as the update data 316 from the loss function data 314. For example, the parameter adjuster 306 may use the loss function data 314 computed using the output analyzer 308 to determine updated values of one or more parameters for one or more of the MLM(s) 102.

In at least one embodiment, the MLM 102 may include a convolutional neural network F, parameterized by learnable weights $\vartheta$ to predict 3D attributes of a mesh with pre-determined topology (e.g., a sphere). The CNN may be used to predict the BRDF attributes θ and light parameters γ (e.g., pixel colors or SG coefficients) so that $F(\tilde{I};\vartheta)=(\pi, \theta, \gamma)$. These parameters may then be rendered back to the image I using the geometry projector 104, the rasterizer 106, the light transport simulator 108, and the pixel determiner 110. The output analyzer 308 may then apply a loss on the RGB output to compute the input image Ĩ and the rendered image I, according to Equation (5):

$$\mathcal{L}_{(\vartheta)} = \alpha_{im}\mathcal{L}_{im}(\tilde{I},I) + \alpha_{msk}\mathcal{L}_{msk}(\tilde{V},V) + \alpha_{per}\mathcal{L}_{per}(\tilde{I},I) + \alpha_{lap}msk\mathcal{L}_{lap}(\pi) \quad (5)$$

Multiple consistency losses may be combined with regularization terms. For example, $\mathcal{L}_{im}$ may refer to an image loss computing the $L^{-1}$-distance between the rendered image I and the input image Ĩ, $\mathcal{L}_{msk}\tilde{I}$, may refer to an intersection-over-union (IoU) loss of the rendered silhouette V and the input mask $\tilde{V}$ of the object, $\mathcal{L}_{per}$ may refer to a perceptual loss computing the $L^{-1}$-distance between the pre-trained features maps of the rendered image and the input image, and $\mathcal{L}_{lap}$ may refer to a Laplacian loss to penalize the change in relative positions of neighboring vertices.

Figure 4:
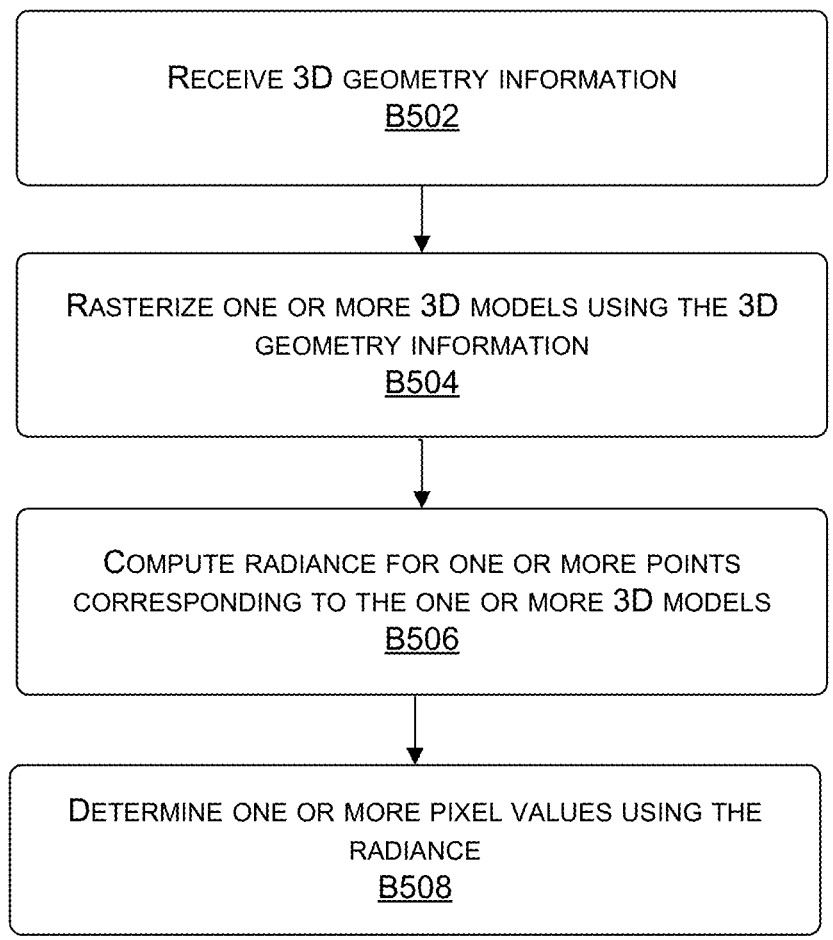
FIG. 4 is a flow diagram showing a method for rendering an image using a hybrid differentiable render, in accordance with some embodiments of the present disclosure.
Figure 5:
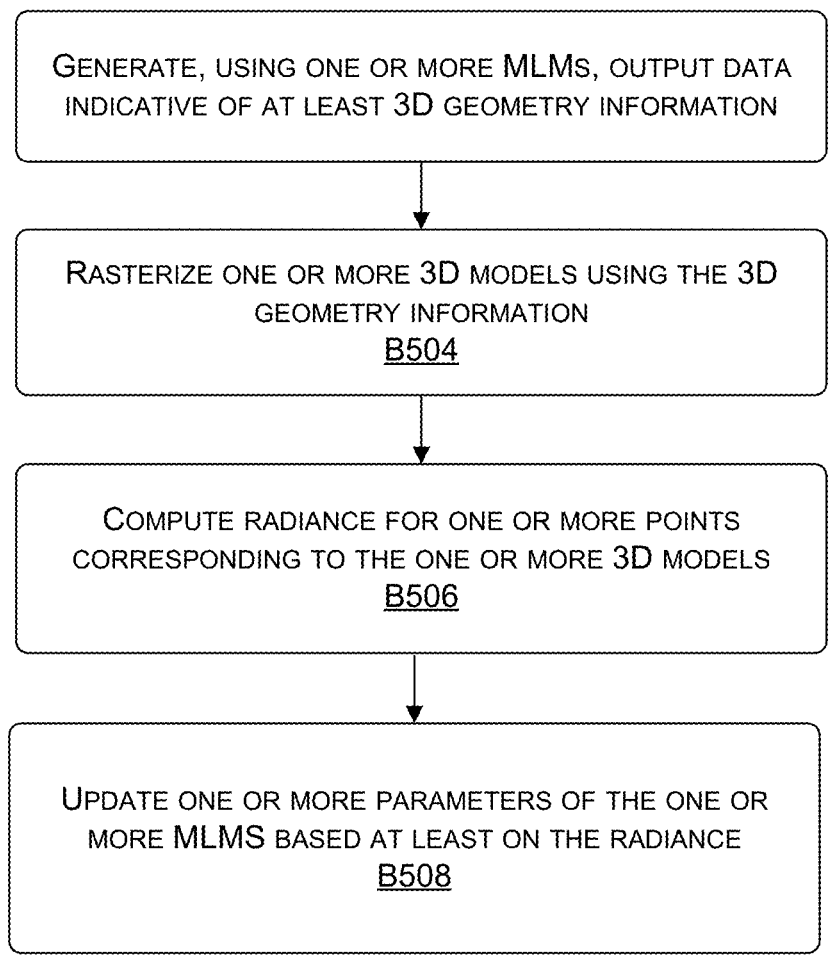
FIG. 5 is a flow diagram showing a method for training one or more MLMs using a hybrid differentiable render, in accordance with some embodiments of the present disclosure.

Now referring to FIGS. 4-5, each block of methods 400 and 500, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, methods 400 and 500 are described, by way of example, with respect to the figures. However, the methods may additionally or alternatively be executed by any one system, or any combination of systems, including, but not limited to, those described herein.

FIG. 4 is a flow diagram showing a method 400 for rendering an image using a hybrid differentiable render, in accordance with some embodiments of the present disclosure. The method 400, at block B402, includes receiving 3D geometry information. For example, the geometry projector 104 may receive the 3D geometry 226 corresponding to one or more 3D models.

The method 400, at block B404, includes rasterizing one or more 3D models using the geometry information. For example, the rasterizer 106 may rasterize, using the 3D geometry 226, the one or more 3D models based at least on a mapping between one or more pixels (e.g., corresponding to the point 210), and one or more portions of the one or more 3D models (e.g., corresponding to the point 212).

The method 400, at block B406, includes computing radiance for one or more points corresponding to the one or more 3D models. For example, the light transport simulator 108 may compute radiance for one or more points (e.g., the point 212) corresponding to the one or more portions of the one or more 3D models based at least on evaluating the BRDF 222 for the one or more points.

The method 400, at block B408, includes determining one or more pixel values using the radiance. For example, the pixel determiner 110 may determine one or more pixel values for the one or more pixels using the radiance.

Referring now to FIG. 5, FIG. 5 is a flow diagram showing a method 500 for training one or more MLMs using a hybrid differentiable render, in accordance with some embodiments of the present disclosure.

The method 500, at block B502, includes generating output data indicative of at least 3D geometry information. For example, the training engine 304 may apply the input data 120 to the MLM 102 to generate output data indicative of the 3D geometry 226 corresponding to one or more 3D models.

The method 500, at block B504, includes rasterizing one or more 3D models using the 3D geometry information. For example, the rasterizer 106 may rasterize, using the 3D geometry 226, the one or more 3D models based at least on a mapping between one or more pixels and one or more portions of the one or more 3D models.

The method 500, at block B506, includes computing radiance for one or more points corresponding to the one or more 3D models. For example, the light transport simulator 108 may compute radiance for one or more points corresponding to the one or more portions of the one or more 3D models based at least on evaluating the BRDF 222 for the one or more points.

The method 500, at block B508, includes updating one or more parameters of the one or more MLMs based at least on the radiance. For example, the training engine 304 may use the update data 316 to update one or more parameters of the MLM 102 based at least on the radiance.

Example Computing Device

Figure 6:
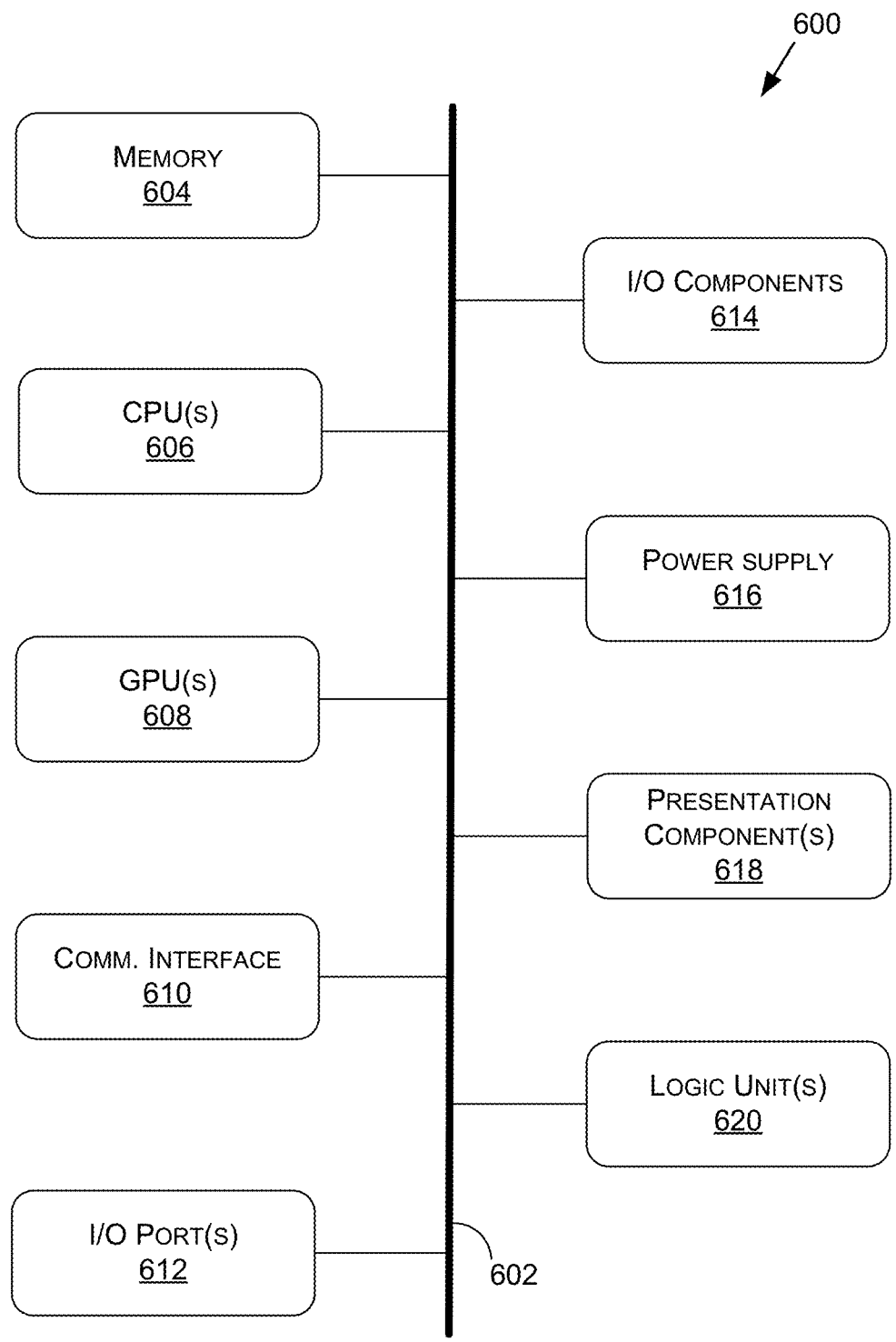
FIG. 6 is a block diagram of an example computing device suitable for use in implementing some embodiments of the present disclosure.

FIG. 6 is a block diagram of an example computing device(s) 600 suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, one or more presentation components 618 (e.g., display(s)), and one or more logic units 620. In at least one embodiment, the computing device(s) 600 may comprise one or more virtual machines (VMs), and/or any of the components thereof may comprise virtual components (e.g., virtual hardware components). For non-limiting examples, one or more of the GPUs 608 may comprise one or more vGPUs, one or more of the CPUs 606 may comprise one or more vCPUs, and/or one or more of the logic units 620 may comprise one or more virtual logic units. As such, a computing device(s) 600 may include discrete components (e.g., a full GPU dedicated to the computing device 600), virtual components (e.g., a portion of a GPU dedicated to the computing device 600), or a combination thereof.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 610 may include one or more receivers, transmitters, and/or transceivers that enable the computing device 600 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 620 and/or communication interface 610 may include one or more data processing units (DPUs) to transmit data received over a network and/or through interconnect system 602 directly to (e.g., a memory of) one or more GPU(s) 608.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, DPUs, etc.), and output the data (e.g., as an image, video, sound, etc.).

Example Data Center

Figure 7:
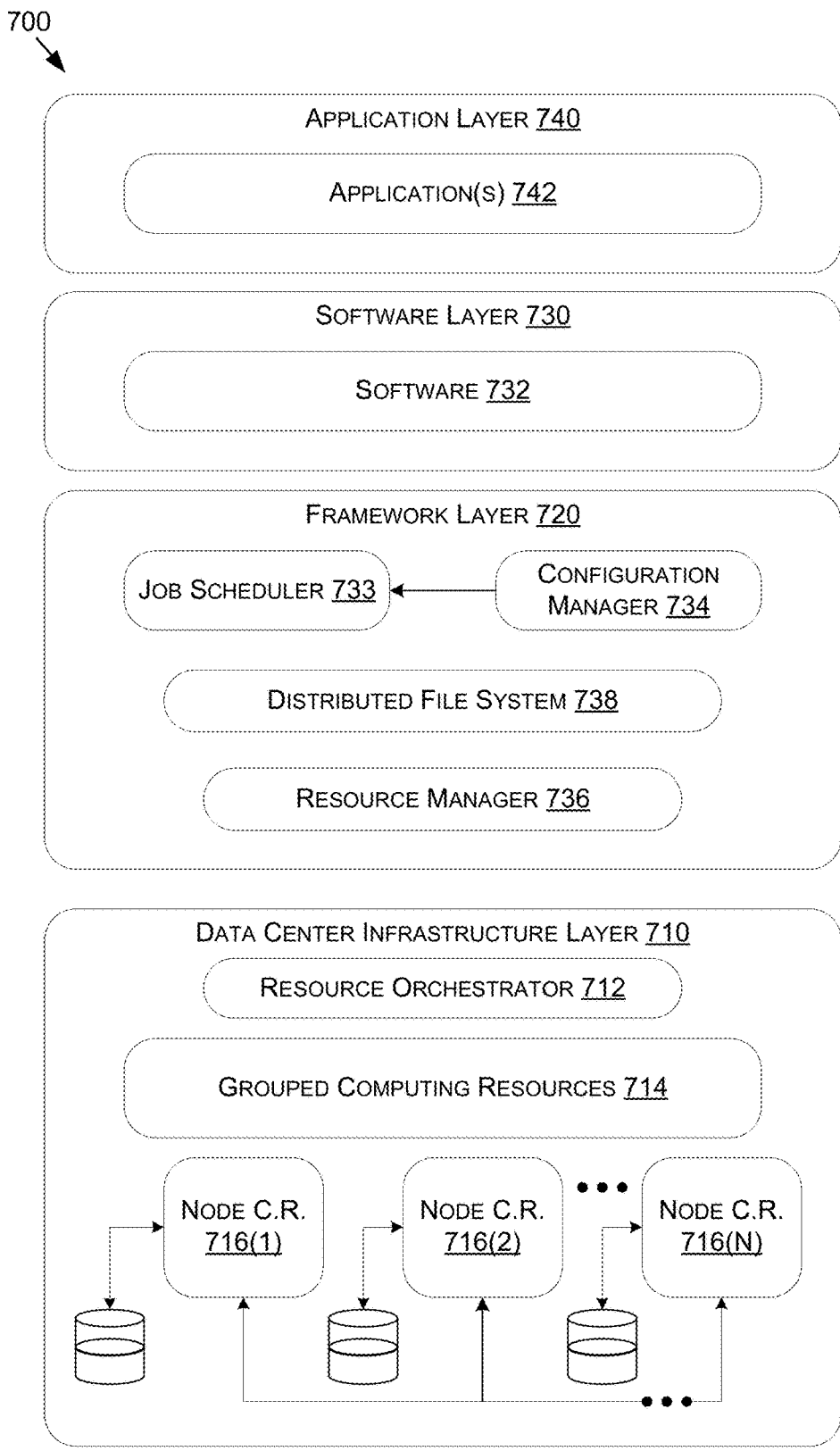
FIG. 7 is a block diagram of an example data center suitable for use in implementing some embodiments of the present disclosure.

FIG. 7 illustrates an example data center 700 that may be used in at least one embodiments of the present disclosure.

The data center 700 may include a data center infrastructure layer 710, a framework layer 720, a software layer 730, and/or an application layer 740.

As shown in FIG. 7, the data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 716(1)-716(N) may correspond to a server having one or more of the above-mentioned computing resources. In addition, in some embodiments, the node C.R.s 716(1)-7161(N) may include one or more virtual components, such as vGPUs, vCPUs, and/or the like, and/or one or more of the node C.R.s 716(1)-716(N) may correspond to a virtual machine (VM).

In at least one embodiment, grouped computing resources 714 may include separate groupings of node C.R.s 716 housed within one or more racks (not shown), or many racks housed in data centers at various geographical locations (also not shown). Separate groupings of node C.R.s 716 within grouped computing resources 714 may include grouped compute, network, memory or storage resources that may be configured or allocated to support one or more workloads. In at least one embodiment, several node C.R.s 716 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 712 may configure or otherwise control one or more node C.R.s 716(1)-716(N) and/or grouped computing resources 714. In at least one embodiment, resource orchestrator 712 may include a software design infrastructure (SDI) management entity for the data center 700. The resource orchestrator 712 may include hardware, software, or some combination thereof.

In at least one embodiment, as shown in FIG. 7, framework layer 720 may include a job scheduler 733, a configuration manager 734, a resource manager 736, and/or a distributed file system 738. The framework layer 720 may include a framework to support software 732 of software layer 730 and/or one or more application(s) 742 of application layer 740. The software 732 or application(s) 742 may respectively include web-based service software or applications, such as those provided by Amazon Web Services, Google Cloud and Microsoft Azure. The framework layer 720 may be, but is not limited to, a type of free and open-source software web application framework such as Apache Spark™ (hereinafter "Spark") that may utilize distributed file system 738 for large-scale data processing (e.g., "big data"). In at least one embodiment, job scheduler 733 may include a Spark driver to facilitate scheduling of workloads supported by various layers of data center 700. The configuration manager 734 may be capable of configuring different layers such as software layer 730 and framework layer 720 including Spark and distributed file system 738 for supporting large-scale data processing. The resource manager 736 may be capable of managing clustered or grouped computing resources mapped to or allocated for support of distributed file system 738 and job scheduler 733. In at least one embodiment, clustered or grouped computing resources may include grouped computing resource 714 at data center infrastructure layer 710. The resource manager 736 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 738 of framework layer 720. One or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 738 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 734, resource manager 736, and resource orchestrator 712 may implement any number and type of self-modifying actions based on any amount and type of data acquired in any technically feasible fashion. Self-modifying actions may relieve a data center operator of data center 700 from making possibly bad configuration decisions and possibly avoiding underutilized and/or poor performing portions of a data center.

The data center 700 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 700. In at least one embodiment, trained or deployed machine learning models corresponding to one or more neural networks may be used to infer or predict information using resources described above with respect to the data center 700 by using weight parameters calculated through one or more training techniques, such as but not limited to those described herein.

In at least one embodiment, the data center 700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 600 of FIG. 6—e.g., each device may include similar components, features, and/or functionality of the computing device(s) 600. In addition, where backend devices (e.g., servers, NAS, etc.) are implemented, the backend devices may be included as part of a data center 700, an example of which is described in more detail herein with respect to FIG. 7.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 600 described herein with respect to FIG. 6. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
    rasterizing a virtual frame depicting one or more 3D models, the rasterizing comprising using three-dimensional (3D) geometry information corresponding to the one or more 3D models to determine one or more portions of the one or more 3D models that correspond to one or more pixels of the virtual frame;

computing one or more radiance values corresponding to the one or more portions of the one or more 3D models using specular light transport simulation with respect to the one or more portions; and determining, based at least on the one or more radiance values, one or more pixel values for the one or more pixels based at least on the determination that the one or more portions correspond to the one or more pixels.

2. The method of claim 1, comprising:

projecting, in a scene, at least a portion of the one or more 3D models onto an image plane corresponding to the one or more pixels using one or more rays cast from one or more cameras in the scene; and identifying one or more points corresponding to the one or more portions of the one or more 3D models for the computing based at least on the projecting;

wherein the computing the one or more radiance values for the one or more points includes evaluating outgoing radiance for the one or more points along the one or more rays.

3. The method of claim 1, wherein the specular light transport simulation includes evaluating a specular bidirectional reflectance distribution function (BRDF) with respect to the one or more portions of the one or more 3D models.

4. The method of claim 3, wherein the evaluating the specular BRDF includes one or more of sampling the specular BRDF using ray-tracing or representing the specular BRDF using a spherical Gaussian basis.

5. The method of claim 1, further comprising applying one or more images depicting one or more objects corresponding to the one or more 3D models to one or more neural networks trained to predict at least the 3D geometry information and color information corresponding to the one or more objects depicted in the one or more images, the one or more pixel values further being based at least on the color information.

6. The method of claim 1, wherein the specular light transport simulation uses surface normal information corresponding to one or more points of the one or more portions of the one or more 3D models.

7. The method of claim 1, further comprising:

generating, using one or more neural networks, color information, wherein the one or more neural networks are to disentangle the color information from lighting information depicted in one or more images, and wherein the one or more pixel values are further determined based at least on the color information.

8. The method of claim 1, wherein the determining the one or more pixel values for the one or more pixels includes:

modifying, using the one or more radiance values, lighting associated with the one or more 3D models to generate data representing modified lighting; and computing the one or more pixel values using the data representing the modified lighting.

9. The method of claim 1, wherein the determining the one or more pixel values for the one or more pixels includes:

modifying color information associated with the one or more 3D models to generate data representing modified color information; and computing the one or more pixel values using the data representing the modified color information.

10. A system comprising:

one or more processing units to performing operations including:

generating, using one or more machine learning models (MLMs), data indicative of at least three-dimensional (3D) geometry information corresponding to one or more 3D models;

based at least on the 3D geometry information, rasterizing the one or more 3D models to determine one or more portions of the one or more 3D models that correspond to one or more pixels;

computing one or more radiance values corresponding to the one or more portions of the one or more 3D models using specular light transport simulation with respect to the one or more portions; and updating one or more parameters of the one or more MLMs based at least on the one or more radiance values.

11. The system of claim 10, wherein the generating the data is based at least in part on the one or more MLMs processing data representative of one or more images of one or more objects corresponding to the one or more 3D models.

12. The system of claim 10, wherein the rasterizing uses a differentiable mapping, and the updating the one or more parameters is based at least on determining one or more pixel values corresponding to the one or more portions using a differentiable parameterization of shading for the one or more pixels.

13. The system of claim 10, wherein the data is further indicative of an environmental lighting map for the one or more 3D models, and the using of the specular light transport simulation is based at least on incoming radiance derived using the environmental lighting map.

14. The system of claim 10, wherein the updating is based at least on comparing first one or more pixel values generated using the one or more radiance values to second one or more pixels values represented by data provided as input to the one or more MLMs.

15. The system of claim 10, wherein the system comprises at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

16. A processor comprising:

one or more circuits to determine, based at least on one or more radiance values computed using specular light transport simulation, one or more pixel values for one or more pixels of a virtual frame depicting one or more 3D models, the one or more radiance values corresponding to one or more portions of the one or more 3D models that correspond to the one or more pixels.

17. The processor of claim 16, wherein the using the specular light transport simulation includes evaluating a specular bidirectional reflectance distribution function (BRDF).

18. The processor of claim 17, wherein the evaluating the specular BRDF includes one or more of sampling the specular BRDF using ray-tracing or representing the specular BRDF using a spherical Gaussian basis.

19. The processor of claim 16, wherein the one or more circuits are further to apply one or more images depicting one or more objects corresponding to the one or more 3D models to one or more neural networks trained to predict at least 3D geometry information and color information corresponding to the one or more objects depicted in the one or more images, the one or more pixel values further being based at least on the 3D geometry information and the color information.

20. The processor of claim 16, wherein the processor comprises at least one of:

a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system implemented using an edge device;
a system implemented using a robot;
a system for performing conversational AI operations;
a system for generating synthetic data;
a system incorporating one or more virtual machines (VMs);
a system implemented at least partially in a data center; or
a system implemented at least partially using cloud computing resources.

* * * * *